(12) United States Patent
Ellin et al.

(10) Patent No.: US 8,141,265 B2
(45) Date of Patent: Mar. 27, 2012

(54) SCALE TRACK

(75) Inventors: Alexander David Scott Ellin, Horsley (GB); Wesley Andrew Heawood, Bristol (GB)

(73) Assignee: Renishaw PLC, Wotton-under-Edge (GB)

( * ) Notice: Subject to any disclaimer, the term of this patent is extended or adjusted under 35 U.S.C. 154(b) by 0 days.

(21) Appl. No.: 12/996,715

(22) PCT Filed: Jun. 11, 2009

(86) PCT No.: PCT/GB2009/001468
§ 371 (c)(1),
(2), (4) Date: Dec. 7, 2010

(87) PCT Pub. No.: WO2010/004248
PCT Pub. Date: Jan. 14, 2010

(65) Prior Publication Data
US 2011/0162223 A1 Jul. 7, 2011

(30) Foreign Application Priority Data

Jun. 17, 2008 (GB) .................................. 0811076.9
Sep. 5, 2008 (GB) .................................. 0816225.7

(51) Int. Cl.
*G01D 5/347* (2006.01)
(52) U.S. Cl. ........................................................ 33/706
(58) Field of Classification Search ..................... 33/706, 33/707, 708
See application file for complete search history.

(56) References Cited

U.S. PATENT DOCUMENTS

| 3,522,568 A | 8/1970 | Hasbrouck |
| 4,170,826 A | 10/1979 | Holstein |
| 4,259,144 A | 3/1981 | Ballentine |
| 4,413,416 A | 11/1983 | Ernst |
| 4,492,033 A | 1/1985 | Ichikawa |
| 4,559,707 A | 12/1985 | Oberhans |
| 4,569,137 A | 2/1986 | Ichikawa |
| 4,570,346 A | 2/1986 | Burkhardt |
| 4,573,000 A | 2/1986 | Nelle |
| 4,631,519 A | 12/1986 | Johnston |
| 4,631,830 A | 12/1986 | Rieder et al. |
| 4,684,257 A | 8/1987 | Hanaoka et al. |
| 4,926,566 A * | 5/1990 | McMurtry et al. .............. 33/706 |
| 4,974,962 A | 12/1990 | Stephens et al. |
| 5,063,685 A | 11/1991 | Morrison et al. |
| 5,065,525 A | 11/1991 | Szenger |

(Continued)

FOREIGN PATENT DOCUMENTS

DE 33 15 214 A1 10/1984

(Continued)

OTHER PUBLICATIONS

Numerik Jena. LIA Series. Exposed Linear Encoder with Signal Control. Nov. 2004.

(Continued)

*Primary Examiner* — G. Bradley Bennett
(74) *Attorney, Agent, or Firm* — Oliff & Berridge, PLC (57) ABSTRACT

A metrological scale track comprising at least first and second metrological scale track strips. The at least first and second metrological scale track strips are held in a spaced apart relationship by at least one spacer. The at least one spacer is configured to be removed once the at least first and second metrological scale track strips have been secured to a substrate.

21 Claims, 7 Drawing Sheets

U.S. PATENT DOCUMENTS

| | | | |
|---|---|---|---|
| 5,088,209 A * | 2/1992 | Lummes et al. | 33/707 |
| 5,630,283 A | 5/1997 | Nelle | |
| 5,687,489 A | 11/1997 | Tondorf et al. | |
| 5,973,494 A | 10/1999 | Masreliez et al. | |
| 5,979,238 A | 11/1999 | Boege et al. | |
| 5,987,768 A | 11/1999 | Freitag et al. | |
| 6,049,992 A | 4/2000 | Freitag et al. | |
| 6,105,271 A | 8/2000 | Freitag et al. | |
| 6,163,970 A | 12/2000 | Nelle et al. | |
| 6,178,656 B1 | 1/2001 | Jung | |
| 6,578,284 B2 * | 6/2003 | Kawada | 33/706 |
| 6,904,696 B2 | 6/2005 | Boge et al. | |
| 7,322,229 B2 * | 1/2008 | Wilhelm | 33/707 |
| 7,421,800 B2 * | 9/2008 | Howley | 33/706 |
| 2003/0226271 A1 | 12/2003 | Cordell | |
| 2004/0101341 A1 | 5/2004 | Boge et al. | |
| 2006/0016090 A1 | 1/2006 | Kuhler et al. | |
| 2009/0271998 A1 * | 11/2009 | Carlen et al. | 33/706 |

FOREIGN PATENT DOCUMENTS

| | | |
|---|---|---|
| DE | 195 26 517 C1 | 12/1996 |
| DE | 195 26 518 C1 | 12/1996 |
| DE | 196 11 983 C1 | 7/1997 |
| DE | 197 19 905 A1 | 11/1997 |
| DE | 197 00 367 A1 | 7/1998 |
| DE | 10 2005 055 513 A1 | 5/2007 |
| EP | 0 036 504 A2 | 9/1981 |
| EP | 0 126 937 A2 | 12/1984 |
| EP | 0 385 418 A2 | 9/1990 |
| EP | 0 388 453 B1 | 6/1993 |
| EP | 0 884 563 A2 | 12/1998 |
| EP | 1 111 346 A2 | 6/2001 |
| GB | 2 107 466 A | 4/1983 |
| JP | A-60-161524 | 8/1985 |
| JP | B2-2837483 | 12/1998 |
| NL | 7711811 | 5/1979 |
| WO | WO 86/03833 A1 | 7/1986 |
| WO | WO 97/04286 A1 | 2/1997 |
| WO | WO 97/36149 A1 | 10/1997 |
| WO | WO 02/084223 A1 | 10/2002 |
| WO | WO 2004/008079 A2 | 1/2004 |
| WO | WO 2005/124282 A2 | 12/2005 |

OTHER PUBLICATIONS

Numerik Jena. LIA Series. Exposed Linear Encoder with Signal Control. Nov. 2006.
British Search Report in British Patent Application No. GB0811076.9; dated Oct. 9, 2008.
International Search Report in International Application No. PCT/GB2009/001468; dated Jun. 22, 2010.
Written Opinion of the International Searching Authority in International Application No. PCT/GB2009/001468; dated Jun. 22, 2010.

* cited by examiner

SCALE TRACK

This invention relates to track for locating a scale for use with encoder apparatus on a substrate.

Metrological scales are used in the position measurement of a moving part of a machine relative to a stationary part. Metrological scale typically has a series of features on it which can be read by a readhead so that the readhead can provide a measure of its position along the scale. The metrological scale can be mounted onto the stationary or moving part of the machine and is read by a suitable readhead which is attached to the other of the stationary and moving part. Types of metrological scale include magnetic scales (in which the scale features are provided by features having particular magnetic properties), capacitive scales (in which the features are provided by features having particular capacitive properties) and optical scales (in which the features are provided by features having particular optical properties). Optical scales can be transmissive or reflective. An example of an optical scale configuration is disclosed in EP-A-0 207 121 and also U.S. Pat. No. 4,974,962.

It is known to affix metrological scale to a part using adhesive. This can however make it difficult to remove and replace the metrological scale. There are occasions when it would be more convenient if it were possible to remove and replace the metrological scale; for instance on a large machine where the machine has to be split into several parts for shipping and where the motion measured by the encoder spans two or more of these parts. The normal way of facilitating this removal and replacement is to fit the scale to the machine using a track.

Figure 6:
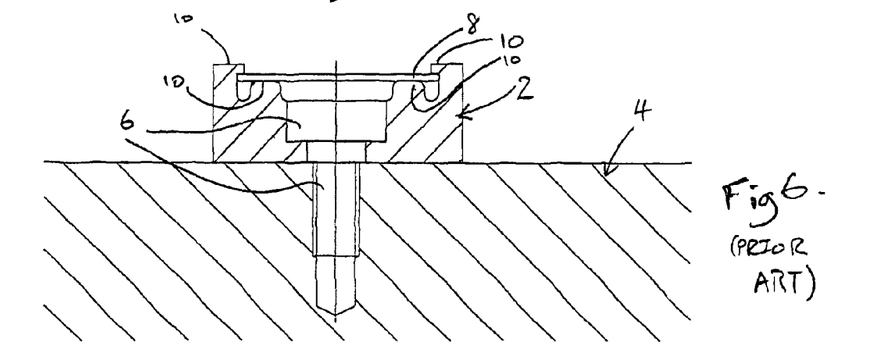
FIG. 6 illustrates a known track system.

An example of a known track consists of an aluminium extrusion 2 of cross-section similar to that shown in FIG. 6, that is bolted or bonded to the machine axis 4 via a fastener 6. The scale 8 is inserted from the end of the track and located vertically and laterally by the features 10 of the extrusion 2. These features 10 should not grip the scale 8 too tightly or it will not be possible to slide the scale 8 up the extrusion 2. The scale 8 can expand and contract along its measuring axis within the extrusion 2 during use which helps to ensure it remains accurate over a range of operating temperatures.

U.S. Pat. No. 6,049,992 also describes a metrological scale track, which in this case comprises separate track strips that are secured to a substrate via adhesive and which locate the metrological scale directly against the substrate.

This invention relates to improved scale track for retaining a scale in position.

According to a first aspect of the invention there is provided a metrological scale track comprising at least first and second metrological scale track strips, held in a spaced apart relationship by at least one spacer which can be removed once the at least first and second metrological scale track strips have been secured to a substrate.

The spacer aids mounting of the metrological scale track by maintaining the track strips in a predetermined spaced apart relationship. This has been found to greatly increase the ease and speed of the track mounting procedure. Once the spacer has been removed, a metrological scale can be received between the at least first and second metrological scale tracks and maintained against the substrate. The invention has been found to provide greater control over the gap between the at least first and second track strips resulting in better control over the lateral positioning of a metrological scale received between the track strips.

The at least first and second track strips and at least one spacer could be provided as a unitary component. Optionally, they could be formed out of separate pieces of material and subsequently fused, for instance via welding, to provide a unitary component.

The at least one spacer could be removed by, for instance, cutting the point(s) of interface between the at least one spacer and the at least first and second track strips. Preferably, the at least one spacer is frangibly coupled to at least one first and second metrological scale track strips. Accordingly, preferably the at least one spacer can be removed by breaking the at least one spacer away from the at least first and second track strips. Preferably, points of weakness are provided at the join between the at least one spacer and the first and second track strips.

Preferably, the at least one spacer and the first and second track strips are formed from a single piece of material. The piece of material can be configured such that the single piece of material is weakened at the point(s) at which the spacer is coupled to the first and second tracks. This can be achieved for instance by the single piece of material being thinner at the point(s) at the interface between the spacer and the first and second tracks.

The at least one spacer can comprise at least one guard adjacent its interface to the first and second tracks. Preferably, the spacer comprises at least one pair of guards, flanking either side of the point(s) at which the space element is joined to the first and second tracks.

The at least one spacer could comprise at least one spacer that is directly coupled to each of the first and second track strips. Optionally, the at least one spacer could comprise first and second elements respectively directly coupled to the first and second metrological scale track strips and at least a third element releasably joining the first and second elements. Accordingly, in this case it can be the at least third element which controls the lateral spacing of the first and second track strips. At least a fourth element can be provided which releasably joins the first and second elements. The at least third element (and at least fourth element if provided) can be frangibly coupled to the first and second elements.

Preferably the first and second tracks are substantially identical in form and dimension. Preferably the first and second tracks are held such that they are substantially directly opposing each other. The metrological scale track could comprise a plurality of track strips on one side of the spacer and a plurality of track strips on the other side of the spacer. Track strips on a common side of the at least one spacer could be pushed up next to each other so that there is no gap between them. Optionally they can be spaced apart along the length of the at least one spacer. A plurality of track strips on a common side could all be held by one common spacer.

Accordingly, each side of the metrological scale track could be provided by a plurality of discrete track strips as opposed to one long continuous track strip. The track strips on one side of the track could all be identical. Optionally, at least one of the track strips is different to at least one other track strip. The track strips on opposing sides of the at least one spacer could be arranged in directly opposing pairs. Optionally, the track strips on opposing sides of the at least one spacer could be arranged in a staggered or even substantially random formation along the length of the track.

The at least first and second track strips can each have a side abutment face for contact with one of the longitudinal edges of a metrological scale. These side abutment faces can be for restricting lateral movement of a metrological scale received between the track strips. The first and second track strips can be held by the at least one spacer such that the distance between their side abutment faces is not less than, and is preferably substantially identical to, the width of a metrological scale for use with the track.

The side abutment face of the first and second track strips can be substantially straight. Accordingly, substantially the entire length of the side abutment face can be for contact with the longitudinal edge of a metrological scale when in use. However, as will be understood, the extent of the side abutment face of at least one of the at least first and second track strips that is for contact with a metrological scale when in use can be less than the length of the first and second track strips. Accordingly, the side abutment face of at least one of the first and second tracks could be configured to contact the longitudinal edge of a metrological scale received between the first and second track strips at a plurality of discrete points along its length. In this case, when in use, there can be at least one space between the metrological scale and the track strip, extending along the length of the metrological scale and in the metrological scale's plane. Accordingly, the side abutment face of at least one of the first and second track strips could comprise at least one abutment, for example a localised protrusion, for instance at least one nub, for contact with a longitudinal edge of a metrological scale. More preferably the side abutment face of at least one of the first and second track strips comprise at least two abutments, for example at least two localised protrusions, for instance at least two nub, for contact with a longitudinal edge of a metrological scale.

Optionally, at least one, and preferably all, of the at least first and second track strips comprise at least one projection configured such that when the track strip is mounted on a substrate, portions of a metrological scale can be received under the at least one projection and retained against the substrate by the projections. The projection on each of the first and second track strips need not extend along the entire length of the track strips. For instance, the at least one projection of each of the first and second track strips could extend along at least 50% of the length of their respective track strip.

Preferably the at least one projection is configured such that in use it extends transversely across a metrological scale by not more than 25% of the width of the scale, more preferably not more than 10%.

A track strip can comprise a plurality of discrete projections spaced along its length. In this case a number of smaller projections could be used to restrict movement of the metrological scale away from the substrate at a number of discrete points along the length of the metrological scale. The discrete projections could be sized and spaced so that not more than 50% of the total length of the track strip comprises projections, more preferably not more than 35%. Preferably, the discrete projections on a track strip are substantially identical in shape and size. Preferably, the discrete projections on a track strip are substantially evenly spaced along the track strip.

The metrological track can be configured such that when in use the gap between the substrate and the at least one projection of each of the first and second track strips is not less than, and is preferably substantially equal to, the thickness of a metrological scale for use with the metrological track. Accordingly, the metrological scale can be received in the gap without being compressed. This is to be contrasted with scale clips or scale clamps which are configured to grip a scale by compressing it against the machine axis. The gap could be greater than the thickness of the metrological scale. However, this would provide reduced control over movement of the metrological scale away from the substrate.

Any abutments provided on a track strip (for contact with the longitudinal edge of a scale so as to control the transverse position of the scale) can be coincident with a projection. For instance, an abutment can be provided underneath a projection. Preferably, the lateral positioning protrusions (i.e. the abutments) are not coincident with the projections. For example, any abutment provided on a track strip and the projections can be provided at different points along the length of a track strip. Accordingly, a track strip's abutment(s) and projection(s) can be provided remote to each other.

The abutments can be substantially the same depth as the track strip (in contrast to the projections which have reduced depth in order to enable a scale to fit between the projection and the substrate).

When in use, a metrological scale received between the at least first and second track strips can be fixed at at least one point along its length to the substrate by a fastener so as to prevent substantive movement of the metrological scale relative to the substrate along its measurement axis. The metrological scale can therefore be prevented from sliding along the substrate, but as the metrological scale is fixed at a point only the metrological scale is free to expand along its length, for instance due to thermal expansion.

The first and second track strips can each have a mounting surface via which they can be mounted to a substrate. The substrate could be the same substrate on which the metrological scale rests.

At least one of the first and second track strips could be for mounting to a substrate by an adhesive. For example, at least one of the first and second track strips could be for mounting to a substrate via double-sided adhesive tape. The double-sided adhesive tape could be supplied as a separate component to the track strip. Optionally the mounting surface could be provided with an adhesive layer.

Optionally at least one of the first and second track strips could be for mounting on a substrate by one or more fasteners. For instance one or more clamps or clips could be used to hold at least one of the first and second track strips on a substrate. Optionally at least one of the first and second track strips could be mounted on a substrate using one or more bolts or screws. In this case at least one of the first and second track strips can have at least one hole through which a bolt or screw can pass.

At least one of the first and second track strips can be formed as a single piece. For instance at least one of the first and second track strips can be moulded or extruded. Optionally at least one of the first and second track strips is formed from sheet material. For instance, at least one of the first and second track strips can be formed from a single sheet of material. For example at least one of the first and second track strips can be formed from a single sheet of material from which material is removed in order to provide the desired shape. For instance at least one of etching, spark eroding or machining can be used to remove the material. Optionally a single sheet of material can be folded to provide the desired shape. Optionally at least one of the first and second track strips can be formed from a number of separate pieces. The separate pieces could be a plurality of layers of sheet material. The layers could be fastened together in order to provide the desired shape.

As will be understood, the first and second track strips could in use be mounted to the substrate which in turn is mounted to a secondary substrate. For instance, the substrate could be a sheet material. For example, the secondary substrate could be the bed of a machine. Accordingly, a scale can be maintained against the substrate by the first and second track strips. The substrate could be mounted to the second substrate, for instance via an adhesive or some other mechanical fastener.

Track strips can be of particular use with thin scales. The track could be for use with metrological scale having a thickness of not more than 1.5 mm, for example not more than 1 mm, preferably not more than 0.5 mm, especially preferably not more than 0.3 mm, most preferably not more than 0.2 mm.

The at least first and second track strips and at least one spacer could be for cutting by a user in order to obtain a desired length of track strip. The at least first and second track strips and at least one spacer could be for cutting by a user in order to obtain a plurality of shorter lengths of track strip from the one original length of track strip.

This application also describes a kit comprising at least one metrological track as described above and a metrological scale for location between the at least first and second tracks.

According to a second aspect of the invention, there is provided a metrological scale track strip for mounting on a substrate, the track strip comprising a plurality of projections spaced along its length. The projections are configured such that when the track strip is mounted on a substrate, portions of a metrological scale can be received under the projections and retained against the substrate by the projections.

As will be understood, the features concerning the track of the above described first aspect of the invention are also suitable for the track strip according to the second aspect of the invention.

In particular, preferably the track strip comprises a side abutment face for abutment with a longitudinal edge of a metrological scale so as to restrict lateral movement of the metrological scale perpendicular to its measurement axis when in use. Preferably, the abutment face comprises a plurality of abutments spaced along its length, each for contact with a local region of the longitudinal edge of a metrological scale so as to control the transverse location of a metrological scale. Preferably, at least some of the abutments are positioned at different points along the length of the track to the projections.

Preferably there is provided at least first and second metrological scale track strips according to the second aspect of the invention, held in a spaced apart relationship by at least one spacer which can be removed once the at least first and second metrological scale track strips have been secured to a substrate. Preferably, the at least one spacer is frangibly coupled to the at least first and second metrological scale track strips.

According to a further aspect, there is provided a measurement apparatus comprising an elongate metrological scale located on a substrate and at least first and second track strips according the above described second aspect of the invention mounted to the substrate on opposing longitudinal sides of the metrological scale, in which the plurality of spaced apart projections extend part way over the metrological scale so as to restrict movement of the metrological scale away from the substrate.

The metrological scale can be fixed at a single point by a fastener so as to prevent movement of the metrological scale relative to the substrate at that point. Optionally, the metrological scale is fixed at a plurality of points to the substrate by at least one fastener such that the scale is constrained to move with the substrate.

As described above, the at least first and second track strips can be mounted to the substrate via an adhesive.

Preferably, the gap between the substrate and the projection of each of the first and second track strips is not less than, and is preferably substantially equal to, the thickness of the metrological scale.

As described above in connection with the other aspects of the invention, the at least first and second track strips can comprise abutment faces for contact with the longitudinal edges of the metrological scale so as to restrict lateral movement of the metrological scale perpendicular to its measurement axis. Preferably, the at least first and second track strips are spaced apart such that the distance between their side abutment faces is not less than, and preferably is substantially identical to, the width of the metrological scale. Preferably, the length of the side abutment face of each of the at least first and second track strips that is in contact with the metrological scale is less than the length of the first and second track strips.

As will be understood, the features concerning the track strips according to the above described other aspects of the invention are also suitable for the track strips of the measurement apparatus according to this aspect of the invention.

Preferably the track strip is configured such that it can wound into a coil having an inner radius of not more than 90 mm, more preferably not more than 75 mm and especially preferably not more than 50 mm without stretching the track strip beyond its elastic limit. This enables a long length of the track strip to be made and easily stored and transported without deforming the track strip. For instance, the track strip can be at least 1 meter long, optionally at least 10 meters long, for example at least 50 meters long, for instance at least 100 meters long.

This application also describes a scale track which is formed from sheet material. In particular the application describes a scale track formed from a single piece of sheet material.

This application also describes metrological scale track comprising a sheet of material folded along opposing edges to define first and second track strips and a base between them, the first and second tracks each having a projection each defining a space between it and the base in which opposing longitudinal edges of a metrological scale can be received.

Although in this aspect metrological scale will be supported by the track, the position of metrological scale is still highly controllable and predictable. This is because the thickness of sheet material can be formed to a high degree of accuracy. Accordingly the variation in height of metrological scale supported by the track relative to a substrate on which the track is mounted will be negligible along the length of the metrological scale.

This application also describes a metrological scale track for locating metrological scale relative to a substrate, the metrological scale tracking having at least one projection for restricting movement of a metrological scale located in the track away from the substrate, the track being formed from sheet material.

An embodiment of the invention will now be described with reference to the following drawings in which:

FIGS. 2(a) and (b) illustrate isometric top and bottom views respectively of a second embodiment of a pair of track strips;

FIGS. 3(a) and (b) illustrate underside views of a track strip according the first and second embodiments;

Figures 1A, 1B:
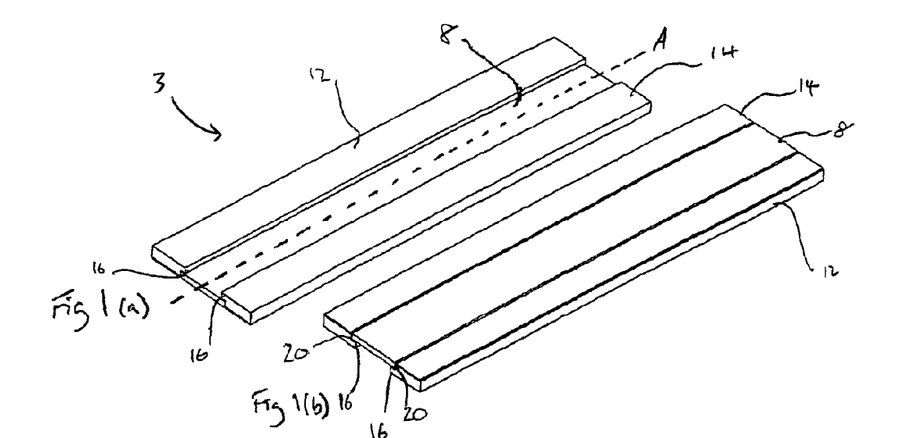
FIGS. 1(a) and 1(b) illustrate isometric topside and underside views respectively of a first embodiment of a pair of tracks strips.
Figure 4:
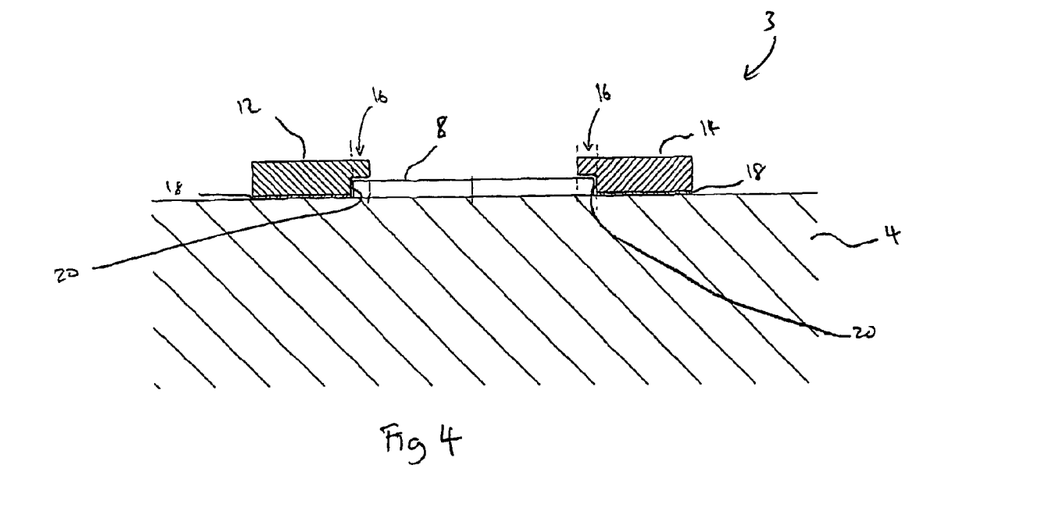
FIG. 4 illustrates a cross-section of the pair of track strips shown in FIGS. 1(a) and (b)

Referring to FIGS. 1(a) and 4 there is shown a metrological scale track 3, comprising first 12 and second 14 track strips which are used to retain a scale 8 on a substrate 4 (not shown in FIGS. 1 and 2 for clarity). Each track strip 12, 14 comprises a strip of material which in the described example is sheet stainless steel although other metals and other non-metal materials can be used. Each track strip 12, 14 has a projection (i.e. a lip) 16 which extends along the length of the track.

The first 12 and second 14 track strips are affixed directly onto the substrate 4 by double-sided adhesive tape 18. Each track strip 12, 14 is fixed such that its projection 16 is spaced apart from the substrate. Furthermore, the track strips 12, 14 are mounted such that the first 12 and second 14 tracks are spaced apart from each other, in a substantially parallel arrangement and with their projections 16 facing each other. Once affixed to the substrate the first 12 and second 14 track strips define a measurement axis A along which a length of metrological scale can be laid.

It will be understood that mechanisms other than double-sided adhesive tape could be used to secure the tracks 12, 14 to the substrate 4. For instance, the track strips 12, 14 could be bolted in position through holes in the tracks 12, 14. As will be understood, the number of bolts or screws used to secure the track strips 12, 14 in place will depend on many factors such as the length of the track strips 12, 14 and their rigidity. Nevertheless, double-sided adhesive tape is a particularly preferred for securing the track strips 12, 14 especially on hard substrates such as substrates made of granite as it significantly reduces the preparation work required to fit the track strips 12, 14 to the substrate.

The gap between the underside of the projections 16 and the substrate 4, and the spacing between the first 12 and second 14 track strips are configured such that a metrological scale 8 can be laid between the first 12 and second 14 track strips by sliding the metrological scale 8 under the projections 16 from one end of the first 12 and second 14 tracks. Once the metrological scale 8 has been laid between the first 12 and second 14 track strips, its position is controlled in two perpendicular dimensions, i.e. in dimensions perpendicular to the measurement axis A.

As the metrological scale rests directly on the substrate the position of the scale relative to the substrate in a dimension perpendicular to the substrate's surface is accurately controllable. This is in contrast to tracks having a scale carrying portion such as those illustrated in FIG. 6 because any inaccuracy in the manufacture of the scale carrying portion can lead to variations in the height of the scale relative to the substrate along the scale's length.

It can be important that the gap between the substrate 4 and the underside of the projection 16 is tightly controlled. The gap is preferably configured to be of a size such that the metrological scale 8 is substantially free to move along the length of the measurement axis A but is constrained from moving away from the substrate. Making the gap such that the metrological scale 8 is substantially free to move along the length of the measurement axis A can aid assembly and disassembly of the metrological scale 8.

Furthermore, the metrological scale 8 and the substrate 4 are likely to be made from materials with different thermal masses (i.e. different coefficients of thermal expansion). Accordingly, the metrological scale 8 and the substrate 4 will change length along the measurement axis A due to thermal expansion at different rates. The more freely the metrological scale 8 can move relative to the substrate 4, the more predictable will be the effect of temperature on the measurement given by a readhead (not shown) reading the metrological scale 8. This is therefore another reason for making the gap a sufficient size to avoid the track strips 12, 14 impinging on the metrological scale 8.

Whilst it can be preferred that the metrological scale 8 is free to move relative to the substrate 4 over most of its length, the metrological scale is preferably restrained at a single point to provide a datum from which all measurements are taken. This datum point could be achieved by means of a mechanical clamp (not shown) applied to the metrological scale 8 at a point along its length. This could be where, for instance, a gap has been left in one of the first 12 and second 14 track strips. Preferably, especially on a longer metrological scale, the datum clamp is applied approximately half way along the length of the metrological scale 8, thus minimising any disturbance effects.

Alternatively, the metrological scale 8 could be mastered to the substrate 4 so that it assumes the thermal characteristics of that substrate. This could be achieved for example by applying a mechanical clamp to both ends of the metrological scale 8.

In a particularly preferred embodiment, ensuring free movement of the metrological scale 8 can be achieved by controlling the gap such that it is approximately the same height as the thickness of the metrological scale 8. For instance, in the described embodiment the metrological scale 8 is approximately 0.2 mm thick. The track strips 12, 14 are approximately 7 mm wide and 0.4 mm thick with the projections 16 being approximately 1 mm wide and 0.2 mm deep. Accordingly, the gap between the underside of the projections 16 and the substrate 4 is approximately 0.2 mm high (the depth of the double-sided adhesive tape being negligible) which is approximately the same height as the thickness of the metrological scale 8. As will be understood the same principle can be applied to metrological scales and tracks of different dimensions. It has been however found that the invention is particularly advantageous for metrological scales having a thickness of not more than 1.5 mm and especially advantageous for metrological scales having a thickness of not more than 1 mm.

Due to their size and material the track strips 12, 14 of the described embodiment can be readily coiled up for shipment. This therefore enables very large lengths of the track, for instance lengths of up to 100 meters to be manufactured and supplied. Preferably the track strips 12, 14 are configured such that they can be coiled to a radius of 50 mm without being stretched beyond its elastic limit.

Figures 2A, 2B:
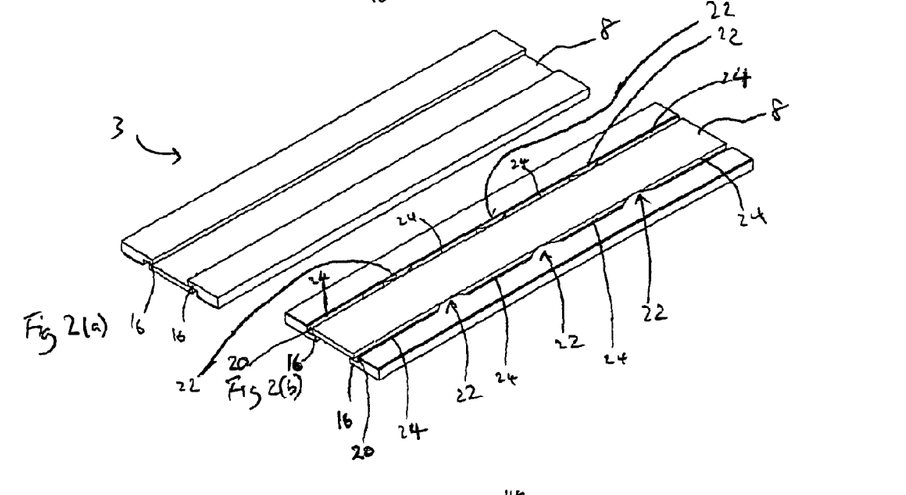
Figures 3A, 3B:
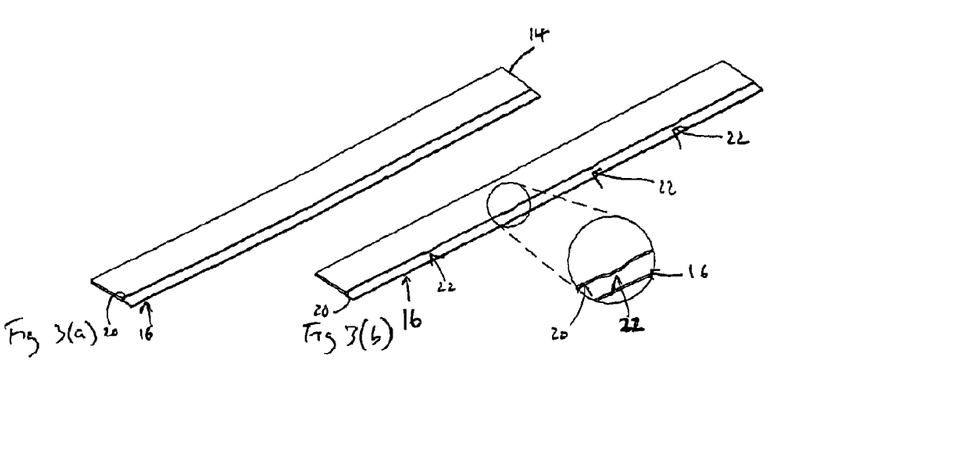

FIGS. 1(b) and 3(a) shows the underside view of the first 12 and second 14 track strips according to a first embodiment. In this case the inner edge 20 of each track strip 12, 14 which face and contact the elongate edges of the metrological scale 8 when in use is straight. However, this need not necessarily be the case as shown in FIGS. 2(*a*), 2(*b*) and 3(*b*) which illustrate a second embodiment which is substantially the same as the first with like reference numerals identifying like features. In this second embodiment of the invention, the inner edge 20 of the track strips 12, 14 which faces the elongate edge of the metrological scale 8 comprises a number of abutments 22 for contact with the metrological scale 8. These abutments 22 reduce the length of the inner edge 20 that is in contact with the metrological scale 8 thereby reducing the amount of friction between the track strips 12, 14 and measurement 8. These abutments also create small areas 24 between the metrological scale 8 and the track strips 12, 14 where contaminants could collect without affecting the performance of the metrological scale 8. As will be understood, the abutments 22 could be formed as one piece with the track strips 12, 14 or could be separate components to the track strips 12, 14.

Figure 10:
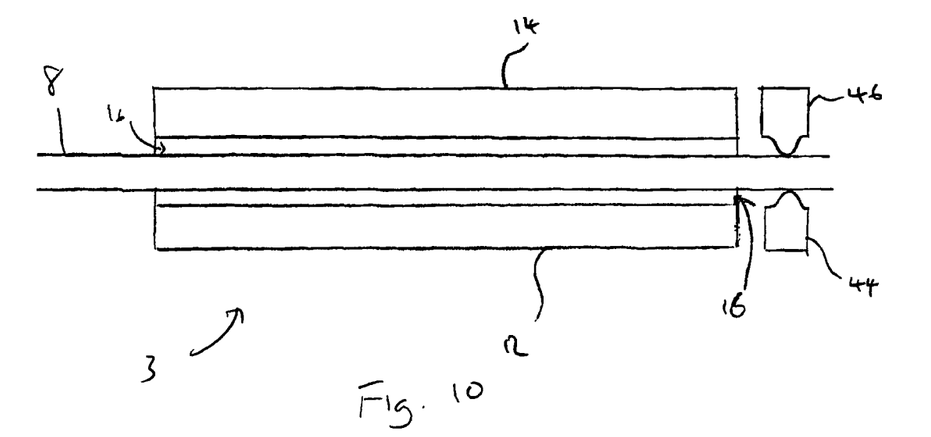
FIG. 10 illustrates an underside view of a pair of track strips in which a metrological scale is laterally constrained by a pair of separate components.

Furthermore, the inner edges 20 need not contact the elongate edges of the metrological scale 8 at all. Accordingly, the first and second track strips can be configured such that in use there is space between the metrological scale and at least one of the first and second track strips along the entire length of the track strip in the plane that wholly contains the metrological scale. For instance, the lateral position of the metrological scale 8 could be controlled by separate first 44 and second 46 lateral restraining components located on either side of the metrological scale 8 at at least one end of the first 12 and second 14 track strips for example as illustrated in FIG. 10. As will be understood a second set of lateral restraining components could be located at the opposing end of the first 12 and second 14 track strips. However, as will be understood, the projection 16 still overhangs the metrological scale 8 thereby retaining it against the substrate 4.

Figure 11:
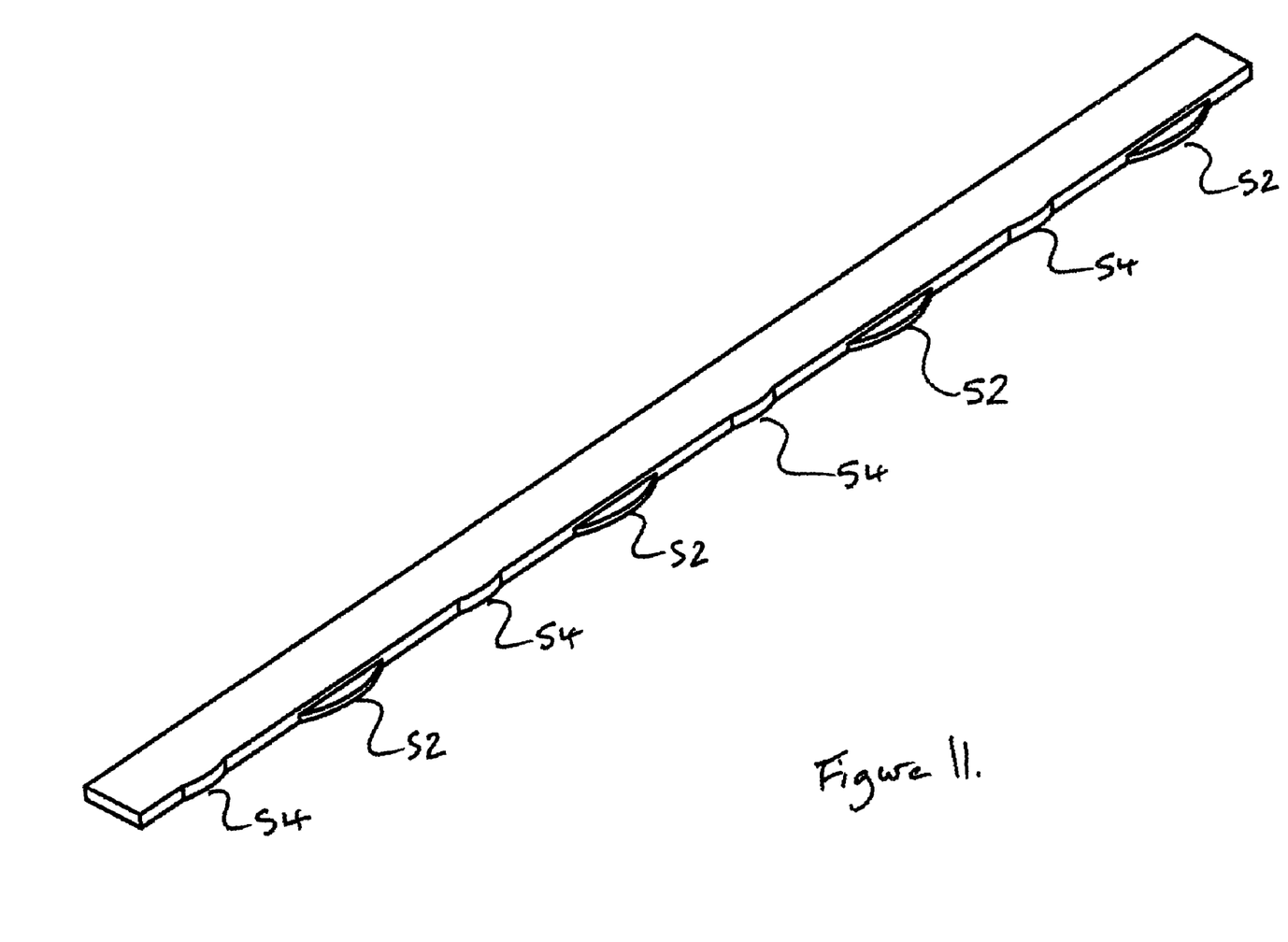
FIG. 11 illustrates an isometric view of another embodiment of a track strip.

The projection 16 need not be a continuous along the length of the track strip but could instead be divided into discrete projections 52 spaced along the length f the track strip 12, 14, for example as illustrated in FIG. 11. Accordingly, the track strips 12, 14 do not cover the metrological scale at the points between the projections 52. This can be advantageous as it enables any dirt that collects between the scale and track strips 12, 14 to escape.

In addition to the projections 52 for retaining the scale against the substrate, the track strip illustrated in FIG. 11 also has abutments 54 for controlling the lateral position of the scale. These abutments 54 could be superimposed on the projections 52 or could be remote from them as illustrated. As previously discussed the track strip can be formed out of thin sheet metal with the thickness of the metal at the projection reduced for example by chemical etching. Unless this etching is very skillfully done, a small radius may be formed at the root of the projection where it joins the main body of the track strip. This radius may interfere with the free movement of the scale within the track. By placing the abutments 54 remote from the projections 52, the abutments prevent the scale contacting any radius formed at the root of the discrete lengths of projection.

When the track strips are produced as continuous lengths, they must be cut to the correct length for installation on the machine. If the projection 16 is continuous as illustrated in FIG. 3, it is difficult to cut the track strip to length without distorting the projection. Any distortions in the projection may prevent the free movement of the scale within the track. This problem can be avoided by limiting the projection to discrete lengths 52 as illustrated in FIG. 11 as it should be possible to cut the track between the discrete lengths of projection, thereby removing the risk of distortion.

Figure 8:
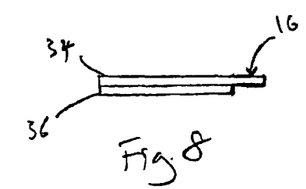
FIG. 8 illustrates a cross-section of a track strip formed by layers of sheet material.
Figure 9:
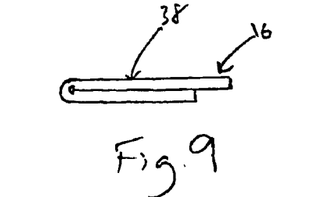
FIG. 9 illustrates a cross-section of a track strip formed by a folded sheet material.

Particularly preferred methods for forming the track strip of the present invention include making the track strip from sheet material. The thickness of sheet material can be manufactured to a high degree of accuracy and therefore this enables the depth of the track strip and projection to be controlled accurately. In the embodiment described with reference to FIG. 4 the original cross-sectional shape of the strip of material forming the track strip is substantially rectangular and the projection 16 is formed by removing material from the corner of the strip of material along its length. The material could be removed for instance by chemical etching, spark erosion or machining. Instead of being etched out of a single piece of material the track strips 12, 14 could be built up from two or more strips of material, such as first 34 and second 36 strips as illustrated in FIG. 8. As illustrated the first 34 and second 36 strips have different widths such that the first 34 strip overhangs the second strip 34 so as to create the projection 16. The first 34 and second 36 strips could be for example, metal bonded, welded or otherwise secured together. The tracks 12, 14 could also be made from a single piece of material 38 folded or formed to produce the projection 16 as illustrated in FIG. 9.

As will be understood, the substrate 4 onto which first 12 and second 14 track strips and metrological scale 8 are mounted could be a machine—that is the first 12 and second 14 track strips and metrological scale 8 could be mounted directly onto a moving or stationary part of a machine. Optionally, the substrate 4 could be an intermediate member which is fixed to a machine.

Figure 7:
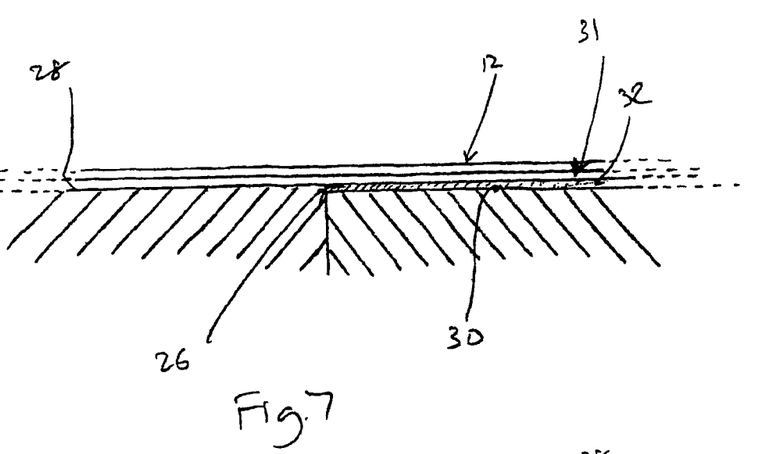
FIG. 7 illustrates a side view of a track strip mounted across a joint between parts of a machine.

This could be particularly preferred when the track strips 12, 14 and metrological scale 8 are to be mounted across a joint between two different parts of a machine, such as for example the joint 26 between first 28 and second 30 parts of a machine illustrated in FIG. 7. It can be important that when designing the joint 26 care is taken to ensure that the surfaces either side of the joint 26 onto which the metrological scale will be applied are coplanar. If it is not possible to make them sufficiently coplanar, instead of applying the tracks 12, 14 directly to the machine axis, a narrow strip of a rigid material for example strip 31 could be secured to the surface of the second part 30 and shimmed 32 to give a coplanar surface to which the first track strip 12 and second track strip 14 (not shown in FIG. 7) are then applied.

Figure 5:
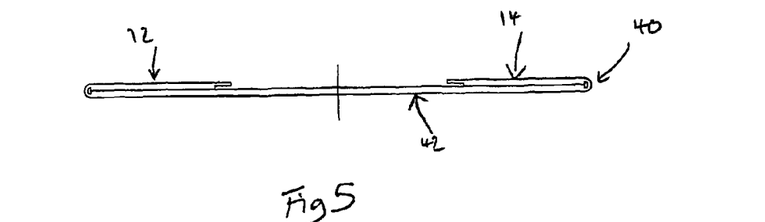
FIG. 5 illustrates a cross-section of a pair of track strips according to a third embodiment.

Furthermore, the first 12 and second 14 track strips could be etched and folded from a single piece of suitably folded thin material 40 as illustrated in FIG. 5. Accordingly, the first 12 and second 14 track strips are joined by a scale support 42 on which the metrological scale 8 rests when the metrological scale 8 is inserted between the first 12 and second 14 track strips. In this embodiment, the thin material 40 is preferably sheet material thereby ensuring a uniform thickness of the scale support 42 along the measurement axis A.

On installation, the first 12 and second 14 track strips could be positioned on a substrate against a locating edge or other locating members such as locating pins. Optionally, the first 12 and second 14 track strips could be positioned using an applicator temporarily bolted to the machine in place of the readhead. The first 12 and second 14 track strips could be installed once the machine onto which the track strips 12, 14 are to be installed has been assembled, thus reducing the risk of damage to them or the metrological scale 8. In the event that the first 12 and second 14 track strips do become damaged, they could be removed and replaced without the need to strip down the machine.

Figure 12:
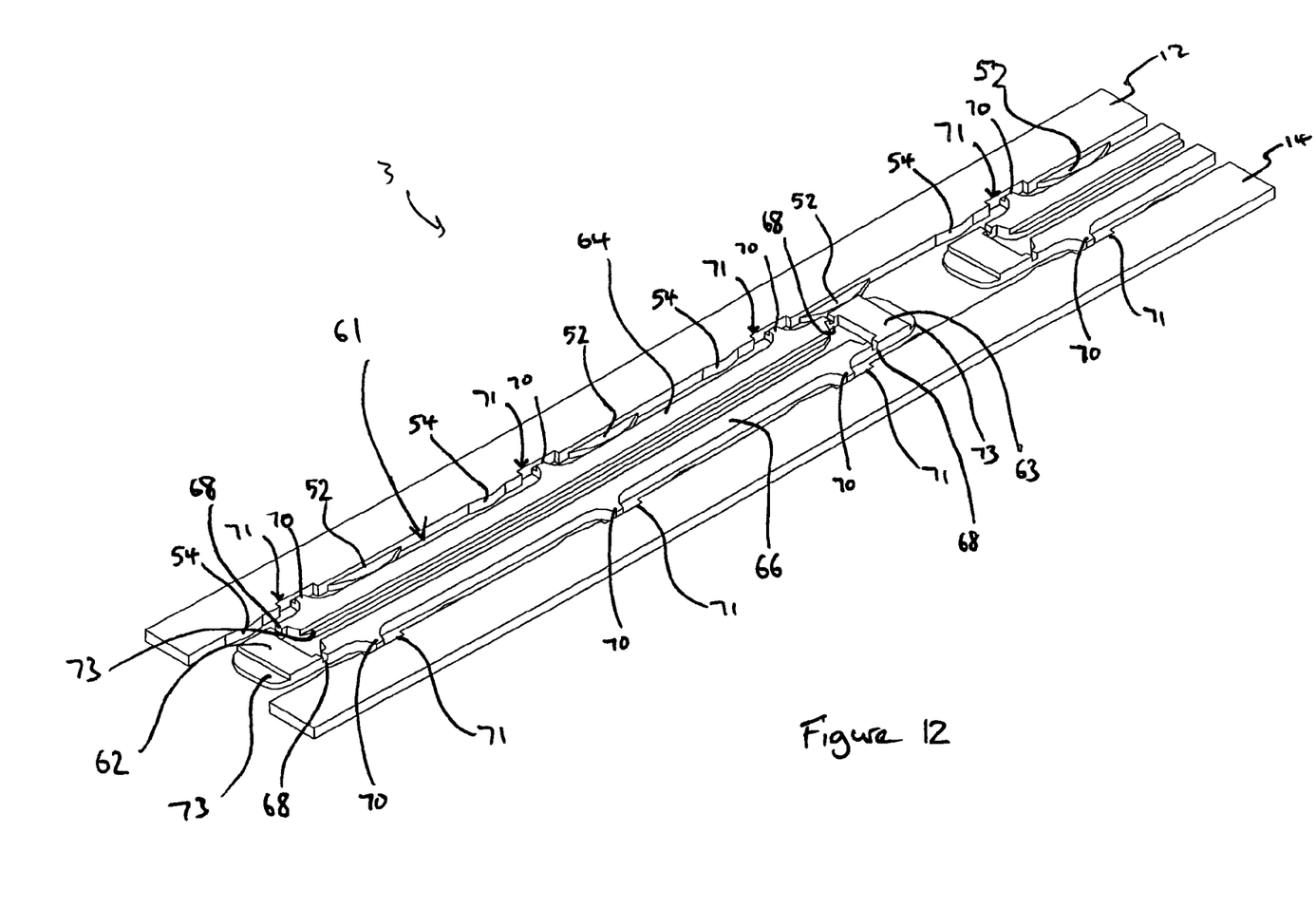
FIG. 12 illustrates an underside isometric view of a pair of track strips held in a spaced apart arrangement by a plurality of spacers.

It can be important that the first 12 and second 14 track strips are positioned the correct distance apart. Positioning the first 12 and second 14 track strips the correct distance apart can be made easier if, during manufacture, they are linked together by a spacer that is removed once the tracks have been installed. In certain situations, removal of the spacer is made easier if the spacer is made in discrete pieces that can be removed independently. One exemplar solution is illustrated in FIG. 12 in which a spacer unit 61 comprises first 64 and second 66 longitudinal spacers and first 62 and second 63 transverse spacers. The first 64 longitudinal spacer is connected to the first 12 track strip by tags 70 and the second 66 longitudinal spacer is connected to the second 14 track strip by similar corresponding tags 70. Furthermore, the first 64 and second 66 longitudinal spacers are joined together by the first 62 and second 63 transverse spacers using tags 68.

Tags 68 and 70 are produced by locally reducing the thickness of the metal by the same means used to form the discrete lengths of projection 52. This can be done, for instance, by an etching process. The tags therefore provide a point of weakness, or a point of reduced strength. The longitudinal spacers 64, 66 and transverse, spacers 62, 63 are configured so that the abutments 54 on the first 12 and second 14 track strips are the correct distance apart. The tags 70 join onto the first 12 and second 14 track strips between the discrete lengths of projection 52 and abutment 54 at recessed locations 71. Recessed locations 71 are provided such that, once the tags 70 are broken, they cannot contact the scale 8.

During installation the first 12 and second 14 track strips remain linked together by the spacers 62, 63, 64, 66 until after they have been secured to the substrate. Once the first 12 and second 14 track strips are secured, the tags 68 joining the first 62 and second 63 transverse spacers to the first 64 and second 66 longitudinal spacers are broken by lifting up the free ends of the first 62 and second 63 transverse spacers. The tags 70 joining the first 64 and second 66 longitudinal spacers to the first 12 and second 14 track strips respectively are then broken by lifting up the free edges of the first 64 and second 66 longitudinal spacers. As shown, areas of reduced depth 73 can be provided at the free ends of the spacers 62, 63, 64, 66 so as to facilitate the insertion of a tool (or for instance a fingernail) under the spacers so as to make it easier to lift the spacers.

It has been found that dividing the spacer into discrete longitudinal and transverse members facilitates the removal of the spacer whilst reducing the risk of disturbing the position of the first 12 and second 14 track strips. However, as will be understood, instead of making the spacer in discrete elements as shown in FIG. 12, it could be made in fewer pieces. For example, the first and second longitudinal spacers could be joined directly to each other along their lengths by breakable tags extending between them. The tags extending between the first and second longitudinal spacers could be broken first, before breaking the tags between the spacers and tracks.

FIG. 12 shows at least one spacer being used to join a pair of continuous lengths of track strip together. Suitably configured, at least one spacer could be used to join multiple discrete lengths of track together in the correct configuration. Again suitably configured, such an arrangement could avoid the need to cut the track to length.

Figure 13A:
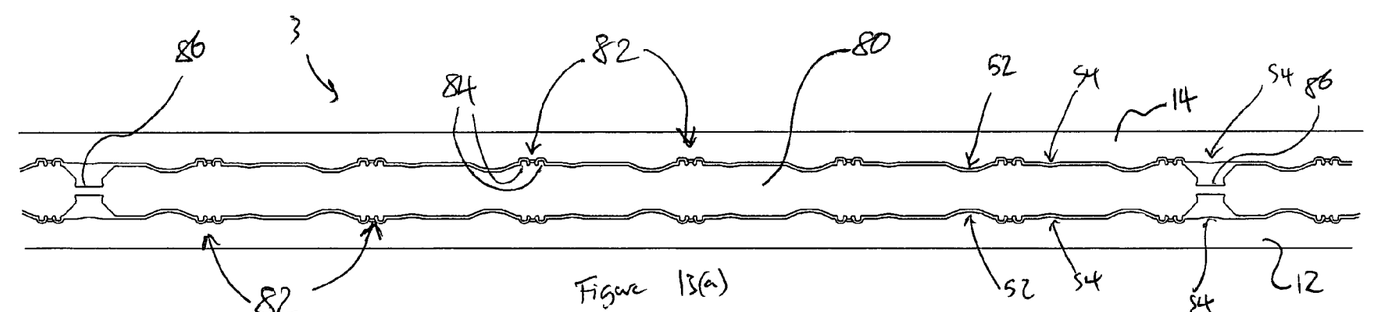
FIG. 13(a) illustrates a top view of a pair of track strips held in a spaced apart arrangement by a single continuous spacer.
Figure 13B:
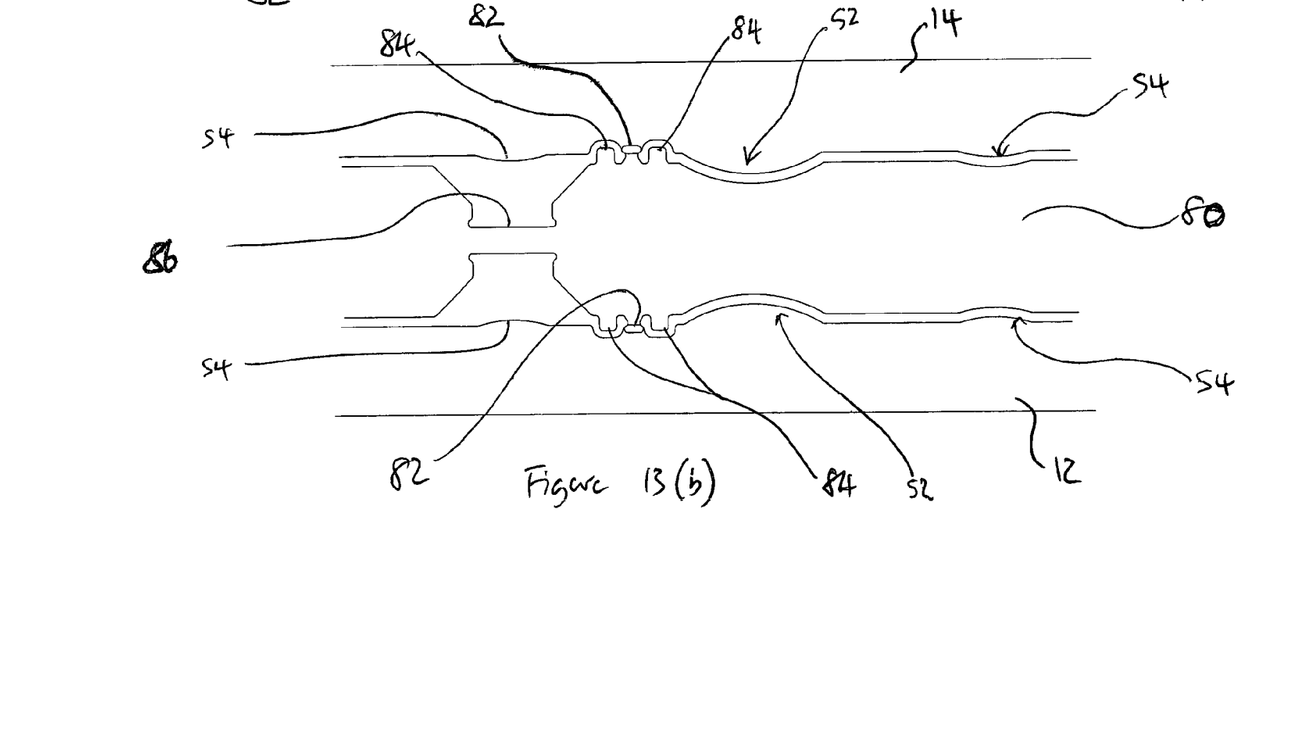
FIG. 13(b) provides a detail view of a section of the pair of track strips and spacer of FIG. 13(a)

FIG. 13 illustrates an alternative embodiment in which the first 12 and second 14 track strips are held in a spaced apart relationship by a single continuous removable spacer 80. The removable spacer 80 is connected to the first 12 and second 14 track strips by a small tag 82 at a plurality of points (in this example every 25 mm) along its length. The small tag 82 is etched part way through the track thickness to produce a point of weakness. Because the tag 82 is etched from the top side instead of from the bottom side of the track strips 12, 14 should the sharp edge be raised when the spacer 80 is removed, it will still be below the top of the track strips 12, 14 and, therefore, not present a snagging/cutting hazard.

As shown, for structural integrity the width of the spacer 80 is only slightly smaller than the distance between the first 12 and second 14 track strips along most of its length. For instance, for the significant majority of the length of the spacer 80, at any two opposing/facing points on the first 12 and second 14 track strips, the width of the spacer is at least 90% of the distance between the opposing two points. However, at regular points 86 along the length of the spacer 80, the width of the spacer 80 is significantly reduced (for instance to less than 50% of the distance between the first 12 and second 14 track strips).

There are two important dimensions to the first 12 and second 14 track strips. The first important dimension is the depth of etching on the projections 52 that in use hold the scale down on the substrate—this can be measured on samples using a micrometer. The second important dimension is the width between the small abutments 54 that locate the scale laterally when in use. This can be measured using a go/no-go gauge at the areas 86 where the spacer 80 has been locally reduced in width as shown in FIGS. 13(*a*) and (*b*).

Removal of the spacer 80 can be achieved by the insertion of a wedge-shaped tool (not shown) at the end of the first 12 and second 14 track strips such that it is positioned under the spacer 80 and above the adjacent sections of first 12 and second 14 track strips. This tool can then be slid along the length of the track, breaking the small tags 82 connecting the spacer 80 to the first 12 and second 14 track strips as it goes. It is possible in certain circumstances that once the spacer 80 has been removed, the remains of the tags 82 on the spacer 80 can have sharp edges which have the potential to cut the hands of the operator. For this reason, a small guard protrusion 84 of substantially full thickness material is placed either side of the tag 82, effectively providing a guard either side of the sharp edge and thus protecting the operator from harm.

One of the significant advantages of this invention is the low friction generated between the first 12 and second 14 track strips and substrate combination and the scale 8. Because of this, the scale is free to expand with temperature as dictated by its own coefficient of thermal expansion without significant influence from the track or substrate. For the scale to work as a metrological device it must be firmly anchored at a single point which then acts as the datum from which all measurements are made.

There are several ways such a datum could be created. For instance, the scale 8 could be glued to at least one of the first 12 and second 14 track strips at one point using, for example, a cyanoacrylate adhesive. This would be easy to apply but difficult to remove without damaging the track strip(s) 12, 14 and scale 8.

Optionally, at least one of the first 12 and second 14 track strips could be cut at the point where the datum is required and a small coupon of material similar to the track strips(s) glued to both the scale 8 and substrate. This would be more difficult to install as the track would need to be applied in two lengths. It would, however be easier to remove without damage.

Figure 14A:
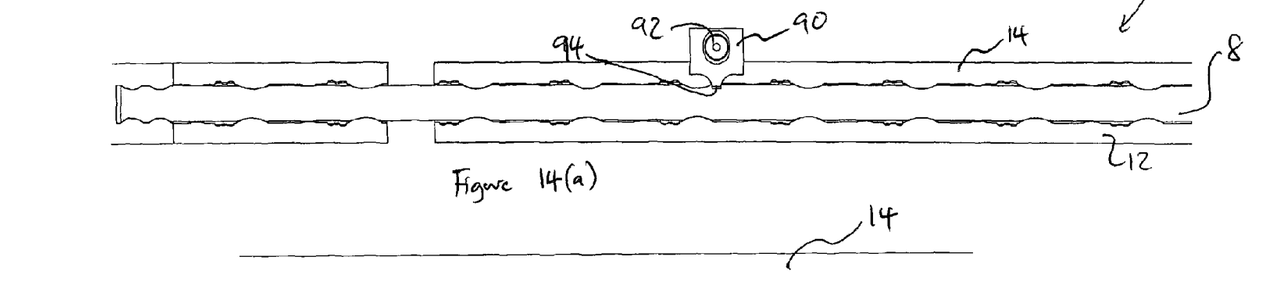
FIG. 14(a) illustrates a top view of a scale located by a pair of track strips according to the present invention and held at one point by a clamp.
Figure 14B:
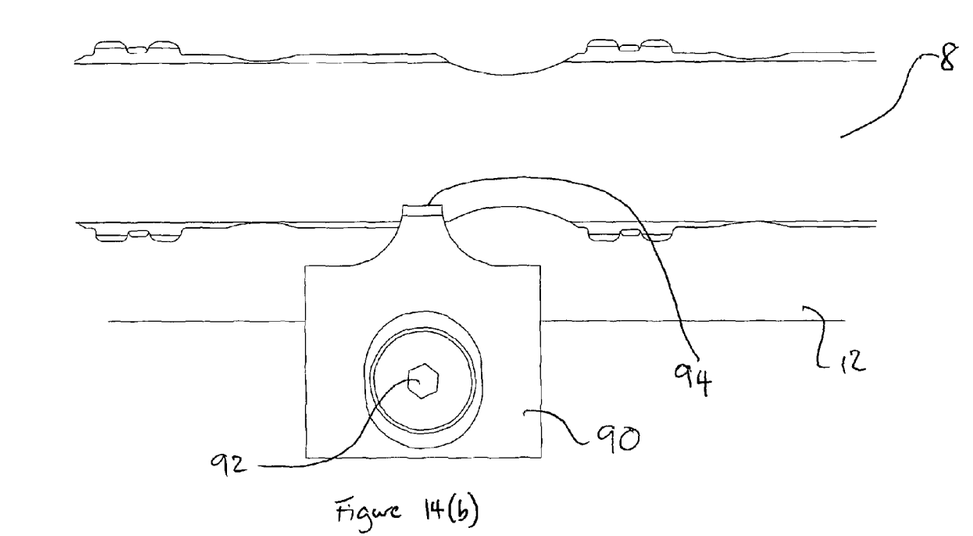
FIG. 14(b) provides a detail view of the a section of the pair of track strips and scale, and the clamp shown in FIG. 14(a).

A clamp 90, such as that illustrated in FIGS. 14(*a*) and (*b*), could be bolted to the substrate using a bolt 92 screwed into a threaded hole (not shown) positioned beyond the outer margin of the second track 14 and, preferably without touching the second track strip 14, have a nib 94 that applies a clamping force to the scale 8. Such a clamp 90 could be used in pairs, one either side of the scale 8, or just on one side only as shown in FIGS. 14(*a*) and (*b*). This has the disadvantage of needing a threaded hole in the substrate and may not be able to withstand as high a longitudinal force as the glued alternatives. There must also be sufficient vertical separation between the scale 8 and readhead to allow the latter to pass over the clamp 90. It can, however, be removed and replaced with ease and without damage to scale 8 or substrate.

In the embodiments described the first 12 and second 14 track strips are identical in shape and size. In this case the first 12 and second 14 track strips could be formed by making a single length of track which is cut in order to provide the desired length of track. This can facilitate easy manufacturing and transportation of the tracks.

However, as will be understood the first 12 and second 14 track strips need not be identical. For instance the first track strip 12 could take the form of the first embodiment described in connection with FIG. 1 and the second track strip 14 could take the form of the second embodiment described in connection with FIG. 2.

In the described embodiments the track strips are configured such that the metrological scale rests directly on the substrate on which the track strips are mounted or on a piece of sheet material (see FIG. 5 for example). This removes any variation in the position of a metrological scale located by the tracks in particular in the dimension perpendicular to the substrate surface which can be caused by current known tracks such as that illustrated in FIG. 6. This therefore improves the consistency of the ride-height of a readhead travelling along the measurement axis reading a metrological scale located by the track strips which in turn improves the accuracy and reliability of measurements taken by a readhead reading a metrological scale located by track strips according to the present invention.

As described, the first and second track strips are substantially elongate. As will be understood, the extent to which the first and second track strips extend along the metrological scale can vary from application to application. For instance, the first and second track strips could extent along at least 75% of the length of the metrological scale, for example at least 90%. The first and second track strips could extend along the entire length of the metrological scale or could even be longer than the metrological scale itself. Optionally, as will be understood, a plurality of relatively short first and second track strips spaced along the length of the metrological scale could be used.

As described, the first and second track strips and spacer are formed and provided as a single piece. However, as will be understood, this need not necessarily be the case and the spacer could for instance be provided as a separate piece to the first and second tracks. For instance, the spacer could be made as separate piece and temporarily fixed to the first and second tracks. For instance, the at least one spacer could be mechanically fastened, for instance via clips, clamps, screws or the like, to each of the first and second tracks at at least one point. In this case, the spacer could be made from a material that is different to that of the first and second track strips. Removing the spacer in this case could comprise, for instance, releasing or breaking the mechanical fasteners.

The metrological scale can be fixed at a single point by a fastener so as to prevent movement of the metrological scale relative to the substrate at that point along its measurement axis. In this case the metrological scale is free to move at other points along the measurement axis, which may occur for instance due to differences in the thermal expansion/contraction of the scale and substrate.

The metrological scale can be fixed at a plurality of points to the substrate, for instance at at least two points, by at least one fastener such that the scale is constrained to move with the substrate. The metrological scale can be fixed at a plurality of points to the substrate, for instance at at least two points, by at least one fastener such that the scale is constrained to move according to the thermal characteristics of the substrate. A plurality of fasteners can be provided. In this case the scale can be forced to expand and contract with the substrate. That is metrological scale can be mastered to the substrate so that it assumes the thermal characteristics of that substrate.

As will be understood references to scale in this document include references to metrological scale, also commonly known as encoder scale. The scale could be optical scale. The scale could be magnetic scale. The scale could be capacitive scale. The metrological scale could provide linear scale.

The scale could be an incremental scale for example as described in EP-A-0207121. As will be understood, an incremental scale typically has a plurality of incremental marks which define a substantially periodic pattern which generates a periodic signal at the readhead when relative movement takes place between the scale and the readhead. These periodic signals can produce an up/down count which enables displacement between the scale and the readhead to be determined.

Reference marks can be provided which enable the exact position of the readhead to be determined. The reference marks can be detected by the same readhead. Reference marks may for example enable the accuracy of the incremental count to be verified and/or to enable a readhead to find a 'home' or known reference position from which to start the incremental count. Reference marks can be located on the scale close to the incremental marks. For instance, the reference marks can be located in a track which runs parallel and adjacent to a track containing the incremental marks. It is also known for reference marks to be embedded within the incremental scale track, for example as disclosed in Published International Patent Application WO 2005/124282.

The scale could be an absolute scale. Such scale typically has a plurality of features which encode unique position data along the measurement direction of the scale. The data can be in the form of, for instance, a pseudorandom sequence or discrete codewords. By reading this data as the readhead passes over the scale the readhead can determine its absolute position.

The scale could be a hybrid incremental absolute scale. International Patent Application no. PCT/GB2002/001629 discloses such a scale in which the absolute position data is embedded in an incremental scale in the form of discrete codewords. This can be achieved by missing lines out from an incremental scale, wherein the presence of a line represents a "0" bit and the absence of a line represents a "1" bit. Different combinations of missing lines in the incremental scale enable codewords to be embedded in the incremental scale. Other mechanisms to achieve a hybrid incremental absolute position scale also exists, such as by varying the width of the lines of the incremental scale (wherein, for instance, a line of one thickness represents a "1" bit and a line of another thickness represents a "0" bit).

The invention claimed is:

1. A metrological scale track comprising at least first and second metrological scale track strips which are linked and held in a spaced apart relationship by at least one spacer which is configured to be removed once the at least first and second metrological scale track strips have been secured to a substrate.

2. A metrological scale track as claimed in claim 1, in which the at least one spacer is frangibly coupled to the at least first and second metrological scale track strips.

3. A metrological scale track as claimed in claim 1, in which the at least one spacer and the first and second track strips are formed from a single piece of material.

4. A metrological scale track as claimed in claim 3, in which the single piece of material is configured such that the single piece of material is weaker at the point(s) at which the spacer is joined to the first and second tracks.

5. A metrological scale track as claimed in claim 4, in which the at least one spacer comprises at least one guard adjacent the point(s) at which it is joined to the first and second tracks.

6. A metrological scale track as claimed in claim 1, in which at least one of the first and second track strips comprises a plurality of projections spaced along its length which are configured such that when the track strip is mounted on a substrate, portions of a metrological scale can be received under the projections and retained against the substrate by the projections.

7. A metrological scale track as claimed in claim 6 in which at least one of the first and second track strips comprises a side abutment face for abutment with a longitudinal edge of a metrological scale so as to restrict lateral movement of the metrological scale perpendicular to its measurement axis when in use.

8. A metrological scale track as claimed in claim 7, in which the abutment face comprises a plurality of abutments spaced along its length, each for contact with a local region of the longitudinal edge of a metrological scale so as to control the transverse location of a metrological scale.

9. A metrological scale track as claimed in claim 8, in which at least some of the abutments are positioned at different points along the length of the track to the projections.

10. A kit comprising at least one metrological track as claimed in claim 1 and a metrological scale for location between the at least first and second tracks.

11. A metrological scale track strip comprising a plurality of projections spaced along its length which are configured such that when the track strip is mounted on a substrate, portions of a metrological scale can be received under the projections and retained against the substrate by the projections.

12. A metrological scale track strip as claimed in claim 11 comprising a side abutment face for abutment with a longitudinal edge of a metrological scale so as to restrict lateral movement of the metrological scale perpendicular to its measurement axis when in use.

13. A metrological scale track strip as claimed in claim 12, in which the abutment face comprises a plurality of abutments spaced along its length, each for contact with a local region of the longitudinal edge of a metrological scale so as to control the transverse location of a metrological scale.

14. A metrological scale track strip as claimed in claim 13, in which at least some of the abutments are positioned at different points along the length of the track to the projections.

15. A metrological scale track comprising at least first and second metrological scale track strips according to claim 11, which are linked and held in a spaced apart relationship by at least one spacer which is configured to be removed once the at least first and second metrological scale track strips have been secured to a substrate.

16. A metrological scale track as claimed in claim 15, in which the at least one spacer is frangibly coupled to the at least first and second metrological scale track strips.

17. A measurement apparatus comprising an elongate metrological scale located on a substrate and at least first and second track strips according to claim 11 mounted to the substrate on opposing longitudinal sides of the metrological scale, the plurality of spaced apart projections extending part way over the metrological scale so as to restrict movement of the metrological scale away from the substrate.

18. A measurement apparatus as claimed in claim 17 in which the metrological scale is fixed at a single point by a fastener so as to prevent movement of the metrological scale relative to the substrate at that point.

19. A measurement apparatus as claimed in claim 17, in which the metrological scale is fixed at a plurality of points to the substrate by at least one fastener such that the scale is constrained to move with the substrate.

20. A measurement apparatus as claimed in claim 17, in which the at least first and second track strips are mounted to the substrate via an adhesive.

21. A measurement apparatus as claimed in claim 17, in which the gap between the substrate and the projection of each of the first and second track strips is not less than the thickness of the metrological scale.

* * * * *